United States Patent
Ryu

(10) Patent No.: US 8,400,977 B2
(45) Date of Patent: Mar. 19, 2013

(54) METHOD FOR PERFORMING CELL SELECTION IN A GSM/GPRS SYSTEM

(75) Inventor: Jin Sook Ryu, Anyang-si (KR)

(73) Assignee: LG Electronics Inc., Seoul (KR)

( * ) Notice: Subject to any disclaimer, the term of this patent is extended or adjusted under 35 U.S.C. 154(b) by 250 days.

(21) Appl. No.: 12/992,586

(22) PCT Filed: May 11, 2009

(86) PCT No.: PCT/KR2009/002466
§ 371 (c)(1),
(2), (4) Date: Nov. 12, 2010

(87) PCT Pub. No.: WO2009/142410
PCT Pub. Date: Nov. 26, 2009

(65) Prior Publication Data
US 2011/0070869 A1 Mar. 24, 2011

(30) Foreign Application Priority Data
May 22, 2008 (KR) .................. 10-2008-0047355

(51) Int. Cl.
*H04W 4/00* (2009.01)

(52) U.S. Cl. ........ 370/330; 455/434; 455/436; 455/437; 455/438; 455/443; 455/552.1; 455/553.1; 370/310.2; 370/314; 370/321; 370/322; 370/328; 370/329; 370/331; 370/337; 370/341; 370/347; 370/350; 370/503

(58) Field of Classification Search ........... 455/412.1, 455/434, 436–438, 443, 522.1, 553.1; 370/310.2, 370/314, 321, 322, 328–331, 337, 341, 347, 370/350, 503
See application file for complete search history.

(56) References Cited

U.S. PATENT DOCUMENTS

| | | | | |
|---|---|---|---|---|
| 6,308,068 | B1 * | 10/2001 | Kunkel ....................... | 455/434 |
| 6,532,223 | B1 * | 3/2003 | Sakoda et al. ............... | 370/337 |
| 6,563,807 | B1 * | 5/2003 | Kim et al. ................... | 370/331 |
| 7,376,424 | B2 * | 5/2008 | Kim et al. ................... | 455/436 |
| 7,869,423 | B2 * | 1/2011 | Ruohonen et al. ........... | 370/350 |
| 2003/0202541 | A1 * | 10/2003 | Lim et al. .................... | 370/503 |
| 2004/0152478 | A1 * | 8/2004 | Ruohonen et al. ........... | 455/502 |
| 2006/0251023 | A1 | 11/2006 | Choi | |
| 2008/0108346 | A1 | 5/2008 | Umatt et al. | |

FOREIGN PATENT DOCUMENTS
KR 10-2007-0076951 A 7/2007
* cited by examiner

*Primary Examiner* — Olumide T Ajibade Akonai
(74) *Attorney, Agent, or Firm* — Lee, Hong, Degerman, Kang & Waimey

(57) ABSTRACT

A method of searching for a different network cell by a mobile station in a global system for mobile communication (GSM)/general packet ratio service (GPRS) system is provided. The method includes receiving from a serving cell an indication message including information on whether to use an extended search frame, and searching for the different network cell by using an idle frame and the extended search frame. A method of effectively searching for a different network cell by a mobile station to interwork with a different network in a global system for mobile communication (GSM)/general packet radio service (GPRS) system can be provided.

6 Claims, 21 Drawing Sheets

METHOD FOR PERFORMING CELL SELECTION IN A GSM/GPRS SYSTEM

CROSS-REFERENCE TO RELATED APPLICATIONS

This application is the National Stage filing under 35 U.S.C. 371 of International Application No. PCT/KR09/02466, filed on May 11, 2009, which claims the benefit of earlier filing date and right of priority to Korean Application No. 10-2008-0047355, filed on May 22, 2008.

TECHNICAL FIELD

The present invention relates to a wireless communication system, and more particularly, to a method of searching for a different network cell by a mobile station to interwork with a different network in a global system for mobile communication (GSM)/general packet radio service (GPRS) system.

BACKGROUND ART

A global system for mobile communication (GSM) is a radio technology which has been developed as a system for standardizing radio communication systems in Europe, and has widely been deployed all over the world. A general packet radio service (GPRS) is introduced to provide a packet switched data service in a circuit switched data service provided from the GSM. An enhanced data rate for GSM evolution (EDGE) increases a data rate by employing 8-phase shift keying (PSK) instead of Gaussian minimum shift keying (GMSK) employed in the GSM. An enhanced general packet radio service (EGPRS) represents the GPRS using the EDGE.

An enhanced general packet radio service phase 2 (EGPRS2) supporting more various modulation and coding schemes has recently being developed. While the EGPRS supports only two modulation schemes (i.e., GMSK and 8-PSK), the EGPRS2 supports four modulate schemes (i.e., quadrature phase shift keying (QPSK), 8-PSK, 16-quadrature amplitude modulation (QAM), and 32-QAM). By supporting the additional modulation schemes, the EGPRS2 enables a high-speed data service by the use of a great data rate and a high symbol rate.

Hereinafter, the GPRS may include not only the typical GPRS but also the enhanced GPRS (EGPRS)/EGPRS2.

A GSM/GPRS system is based on time division multiple access (TDMA). Information items are transmitted when communication is made between a base station (BS) and a mobile station (MS), and are delivered to the BS or the MS in accordance with a timeslot. Hereinafter, downlink is defined as communication from the BS to the MS, and uplink is defined as communication from the MS to the BS.

When the GSM/GPRS system based on the TDMA is referred to as a $2^{nd}$ generation (2 G) wireless communication system, a universal mobile telecommunication system (UMTS) based on a wideband code division multiple access (WCDMA) can be referred to as a $3^{rd}$ generation (3 G) wireless communication system. Standardization on a long term evolution (LTE) wireless communication system based on an orthogonal frequency division multiple access (OFDMA) is also in progress. LTE is also referred to as an evolved-UMTS terrestrial radio access network (E-UTRAN).

With the introduction of various types of wireless communication system, interworking between the existing GSM/GPRS system and a new network (e.g., the UMTS) has arisen as a problem. This is because, when a new network system is introduced, the new network system is preferably compatible with the existing GSM/GPRS system in terms of convenience from the perspective of users and also in terms of the reuse of the existing equipment from the perspective of service provides.

The UMTS supports a compressed mode to measure neighbor cells of a network using a different frequency, which is disclosed in the section 4.4 of 3GPP TS 25.212 V7.1.0 (2006-06) 'Multiplexing and channel coding (FDD) (Release 7)'. The compressed mode denotes temporary suspension of transmission and reception to perform inter-frequency measurement.

When the MS belongs to the GSM/GPRS cell, a serving cell is the GSM/GPRS cell. A neighbor cell neighboring to the serving cell may be not only the GSM/GPRS cell but also a different network cell. Hereinafter, a different network is defined as a network that uses a different frequency or a different radio access technology from that used in the GSM/GPRS. Examples of the different network may include the UMTS, the E-UTRAN, and a system conforming to the institute of electrical and electronics engineers (IEEE) 802.16 standard. The MS may support a multi-radio access technology (RAT). When the MS supports the multi-RAT, it implies that the MS supports not only the GSM/GPRS but also the different network.

In order for the MS belonging to the GSM/GPRS cell to prepare for a handover to the different network cell which is different from that of the GSM/GPRS system, the MS has to search for the different network cell. The process of searching for the different network cell is performed by the MS to measure a cell of the different network cell or is performed by the MS to attempt to acquire synchronization with the different network cell. In order for the MS to search for the different network cell, radio resources have to be sufficiently ensured. However, it is difficult for the MS to sufficiently ensure the radio resources required to search for the different network cell. This is because a service state has to be maintained with respect to the GSM/GPRS cell until the MS moves to the different network cell.

Accordingly, there is a need for a method capable of searching for a different network cell by an MS while receiving a service from a GSM/GPRS cell, by effectively using limited radio resources.

DISCLOSURE

Technical Problem

The present invention provides a method of effectively searching for a different network cell by a mobile station in a global system for mobile communication (GSM)/general packet radio service (GPRS) system.

Technical Solution

According to an aspect of the present invention, a method of searching for a different network cell by a mobile station in a GSM/GPRS system is provided. The method includes receiving from a serving cell an indication message including information on whether to use an extended search frame, and searching for the different network cell by using an idle frame and the extended search frame.

According to another aspect of the present invention, an apparatus for wireless communication is provided. The apparatus includes a radio frequency (RF) unit for transmitting and/or receiving a radio signal, and a processor coupled to the RF unit and configured to receive from a serving cell an indication message including information on whether to use an extended search frame and search for a different network cell by using an idle frame and the extended search frame.

Advantageous Effects

A method of effectively searching for a different network cell by a mobile station to interwork with a different network in a global system for mobile communication (GSM)/general packet radio service (GPRS) system is provided. Therefore, overall system performance can be improved.

MODE FOR INVENTION

Figure 1:
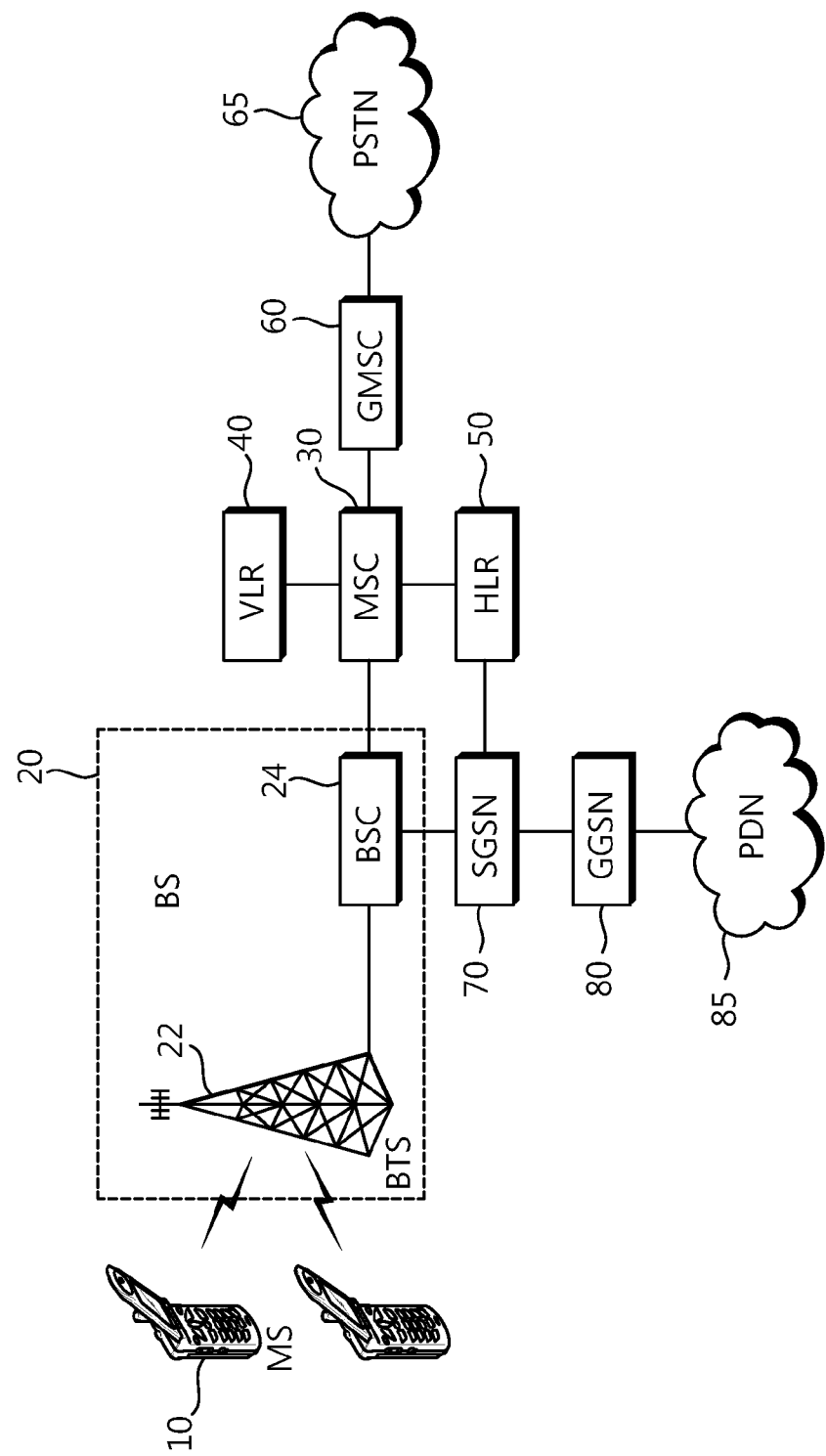
FIG. 1 is a block diagram showing a wireless communication system.

FIG. 1 is a block diagram showing a wireless communication system. The wireless communication system uses a global system for mobile communication (GSM)/general packet radio service (GPRS)-based network. Hereinafter, GPRS may include not only a typical GPRS but also an enhanced GPRS (EGPRS)/EGPRS2. The wireless communication systems are widely used to provide a variety of communication services of voice, packet data, and so on.

Referring to FIG. 1, a mobile station (MS) 10 is a communication instrument carried by a user and may be called other terms such as a user equipment (UE), a user terminal (UT), a subscriber station (SS), a wireless device, etc.

A base station (BS) 20 includes a base transceiver station (BTS) 22 and a base station controller (BSC) 24. The BTS 22 communicates with the MS 10 in one cell area through a radio interface, and performs a synchronization function with the MS 10. The BSC 24 interfaces at least one BTS 22 with a mobile switching center (MSC) 30.

The MSC 30 connects the BS 20 to a heterogeneous network such as a public switching telephone network (PSTN) 65 or a public land mobile network (PLMN) through a gateway MSC (GMSC) 60. A visitor location register (VLR) 40 stores temporary user data, and includes information regarding the roaming of all the MSs 10 in a service area of the MSC 30. A home location register (HLR) 50 includes information regarding all subscribers in the home networks. A serving GPRS support node (SGSN) 70 takes charge of mobility management of the subscribers. A gateway GPRS data network (GGSN) 80 routes a packet at the current position of the MS 10 to interface the MS with an external packet data network such as a public data network (PDN) 85.

Hereinafter, a packet idle mode denotes a mode in which a temporary block flow (TBF) is not provided, and a packet transfer mode denotes a mode in which a radio resource is allocated to an MS and thus at least one TBF is provided. The TBF denotes a physical access used between two radio resource entities supporting unilateral transmission of a logical link control (LLC) protocol data unit (PDU) on a packet data physical channel. At least one TBF is provided in the packet transfer mode. A temporary flow identity (TFI) is allocated to each TBF by a network, and is unique between TBFs currently being provided in each direction.

The MS receives a circuit-switched service in a dedicated mode, and receives a packet-switched service in the packet transfer mode. When in the dedicated mode, a GSM-based service is provided. When in the packet transfer mode, a GPRS or EGPRS-based service is provided. When in a dual transfer mode (DTM), the MS is in both the dedicated mode and the packet transfer mode.

Figure 2:
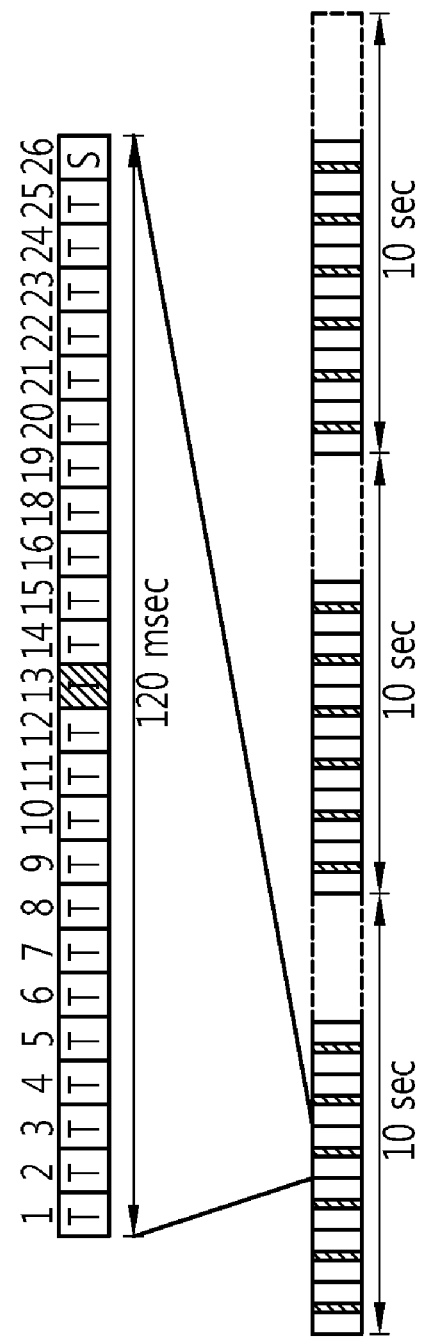
FIG. 2 shows an example of a frame for synchronization acquisition of neighbor cells in a dedicated mode.

FIG. 2 shows an example of a frame for synchronization acquisition of neighbor cells in a dedicated mode. In this case, all of the neighbor cells are GSM/GPRS cells.

Referring to FIG. 2, a multi-frame includes 26 time division multiple access (TDMA) frames in the dedicated mode. One TDMA frame includes at least one timeslot. The 26 TDMA frames include 24 TDMA frames T, each of which includes a burst of a traffic channel, one TDMA frame S reserved for a slow associated control channel (SACCH), and one idle frame I. During the idle frame I, an MS does not perform transmission and reception but performs measurements on the neighbor cells. Since neighbor-cell measurement is performed in the idle frame I, the idle frame I is also referred to as a search frame.

Although a $13^{th}$ TDMA frame is used herein as the idle frame I among the 26 TDMA frames, this is for exemplary purposes only. For another example, the idle frame may be located in a $26^{th}$ TDMA frame, and the SACCH may be located in the $13^{th}$ TDMA frame.

In the dedicated mode, a measurement period is 10 seconds. That is, the MS has to attempt to acquire synchronization with the neighbor cells in every measurement period (i.e., 10 sec) as much as possible, as frequently as possible, and at least once. For the 10 seconds, such a synchronization acquisition operation is performed during the idle frame in the multi-frame structure.

Figure 3:
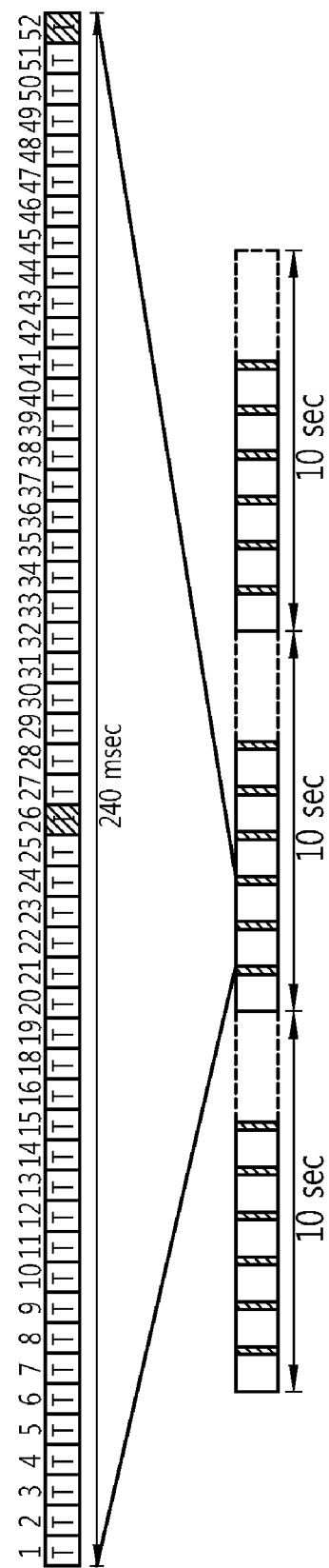
FIG. 3 shows an example of a frame for synchronization acquisition of neighbor cells in a packet transfer mode or in a dual transfer mode (DTM).

FIG. 3 shows an example of a frame for synchronization acquisition of neighbor cells in a packet transfer mode or in a DTM.

Referring to FIG. 3, a multi-frame includes 52 TDMA frames in the packet transfer mode or the DTM. Among the 52 TDMA frames, a $26^{th}$ TDMA frame and a $52^{nd}$ TDMA frame are idle frames I. One TDMA frame may include 8 timeslots. According to the GSM standard, the 52 TDMA frames have a length of 240 milliseconds (ms), one TDMA frame has a length of 4.62 ms, and one timeslot has a length of 0.577 ms.

First, a case where all neighbor cells are GSM/GPRS cells will be described.

An MS has to measure cell power of at least one serving cell or neighbor cell in every frame. The MS has to measure cell power of the serving cell at least 6 times during the 52 TDMA frames. In order to measure effective cell power, measurement has to be performed for each cell at least 5 times. However, cell power measurement may be skipped for measurement of a different network or for synchronization acquisition of up to 8 TDMA frames among the 52 TDMA frames.

In the packet transfer mode or the DTM, a measurement period is 10 seconds. That is, the MS has to attempt to acquire synchronization with the neighbor cells in every measurement period (i.e., 10 seconds) as much as possible, as frequently as possible, and at least once. For the 10 seconds, such a synchronization acquisition operation is performed during the idle frame in the multi-frame structure.

Next, a case where the neighbor cells are GSM/GPRS cells or UTRAN cells will be described.

The MS may perform synchronization acquisition or cell power measurement on the UTRAN cell by using up to 25 idle frames for 13 seconds. However, the MS can perform synchronization acquisition or cell power measurement on the UTRAN cell when the UTRAN cell is included in a neighbor cell list, when cell power of the serving cell is less than a specific threshold, i.e., Qsearch_P, or when synchronization acquisition and interference measurement of the GSM/GPRS cell is not required. In addition, when 3 G_SEARCH_PRIO which indicates cell search of a different network cell and which is included in a measurement information message is set to '1', the MS can perform synchronization acquisition or cell power measurement on the UTRAN cell irrespective of the synchronization acquisition and interference measurement of the GSM/GPRS cell.

Interworking between two heterogeneous networks, i.e., the GSM/GPRS cell and the UTRAN cell, was necessary in the past, whereas it is expected that interworking of three heterogeneous networks will be necessary in the future with the widespread use of an E-UTRAN system. In a currently available E-UTRAN system, 168×3(=504) cells exist about one center frequency.

Next, a case where the neighbor cells are GSM/GPRS cells, UTRAN cells, or E-UTRAN cells will be described.

Figure 4:
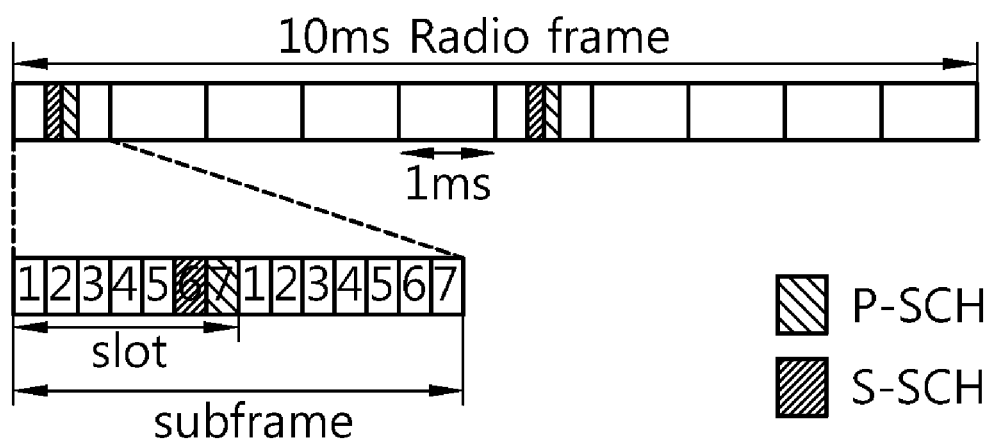
FIG. 4 shows a radio frame structure in an evolved-UMTS terrestrial radio access network (E-UTRAN).

FIG. 4 shows a radio frame structure in E-UTRAN. The section 4.1 of 3GPP TS 36.211 V8.0.0 (2007-09) Technical Specification Group Radio Access Network; Evolved Universal Terrestrial Radio Access (E-UTRA); Physical channels and modulation (Release 8) can be incorporated herein by reference.

Referring to FIG. 4, a radio frame includes 10 subframes, and one subframe includes 2 slots. When one slot has a length of 0.5 ms, the subframe consisting of 2 slots has a length of 1 ms. Therefore, the radio frame consisting of 10 subframes has a length of 10 ms.

One slot includes a plurality of orthogonal frequency-division multiplexing (OFDM) symbols in a time domain. Although one slot includes 7 OFDM symbols herein, the number of OFDM symbols included in one slot may vary according to a cyclic prefix (CP) structure.

A primary synchronization channel (P-SCH) is located in a last OFDM symbol of a $1^{st}$ slot and a $10^{th}$ slot. The P-SCH is used to acquire OFDM symbol synchronization or slot synchronization. A secondary synchronization channel (S-SCH) is located in an immediately previous symbol of the last OFDM symbol of the $1^{st}$ slot and the $10^{th}$ slot. The S-SCH and the P-SCH may be located in contiguous OFDM symbols. The S-SCH is used to acquire frame synchronization.

In order for an MS to perform synchronization acquisition on an E-UTRAN cell or to measure a received signal magnitude, the MS has to receive the P-SCH and S-SCH existing in one radio frame.

Figure 5:
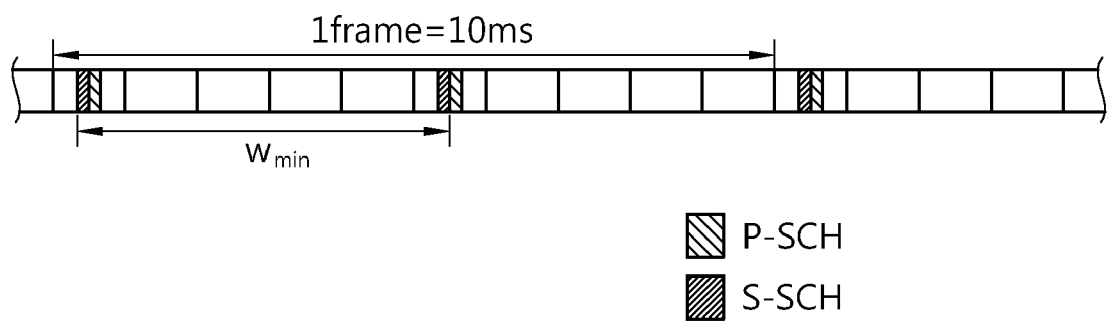
FIG. 5 shows a minimum window size when a mobile station performs synchronization acquisition on an E-UTRAN cell.

FIG. 5 shows a minimum window size when an MS performs synchronization acquisition on an E-UTRAN cell.

Referring to FIG. 5, a minimum window size $w_{min}$ required for synchronization acquisition of the E-UTRAN cell is '10 slots+one OFDM symbol'. One slot has a length of 0.5 ms. When considering a CP length, one OFDM symbol has a length of 0.083 ms. Therefore, the window size $w_{min}$ is approximately 5.083 ms (0.5 ms+0.083 ms). The window size $w_{min}$ of 5.083 ms is a value corresponding to a timeslot of 8.81 (i.e., 5.083/0.577=8.81). Therefore, a timeslot of 8.81 is required at least in order for the MS to search for the E-UTRAN cell in a packet transfer mode or a DTM. In addition, an additional time is required to change from a GSM/GPRS frequency to an E-UTRAN frequency in order to perform a synchronization acquisition operation on the E-UTRAN cell during the MS is actually performing data transmission and/or reception in a GSM/GPRS cell. Therefore, in order for the MS to perform the synchronization acquisition operation on the E-UTRAN cell in the packet transfer mode or the DTM, a required time is at least 10 timeslots by adding a time for frequency change and a minimum time (e.g., a timeslot of 8.81) for receiving at least one P-SCH and S-SCH in a radio frame of 10 ms in the E-UTRAN cell.

In case of interworking between the GSM/GPRS cell and the UTRAN cell, cell power measurement and synchronization acquisition are possible by comparing cell power of the GSM/GPRS cell with a specific threshold. Meanwhile, in case of the E-UTRAN cell, cell power measurement of the E-UTRAN cell is basically required irrespective of cell power of the GSM/GPRS cell under the major premise of an absolute priority mechanism. In addition, in case of interworking between the GSM/GPRS cell and the UTRAN cell, a list of UTRAN cells to be measured is given to the MS, whereas in case of interworking with the current E-UTRAN cell, whether to support the list of E-UTRAN cells to be measured is not determined. In case of interworking between the GSM/GPRS cell and the E-UTRAN cell, cell power measurement of the GSM/GPRS cell and the E-UTRAN has to be performed in parallel. If the E-UTRAN cell list is not provided, cell power measurement has to be performed in parallel in a worst case scenario. An overhead thereof is expected to be much greater than a case of interworking between the GSM/GPRS cell and the UTRAN cell if a time for synchronization acquisition is also considered.

The E-UTRAN cell supports a data service of a very high speed of 100 megabits per second (Mbps) in downlink and 50 Mbps in uplink. In order to for the MS supporting a multi-RAT to receive the high-speed data service, it is effective to move to the E-UTRAN cell as quickly as possible. However, when interworking with the E-UTRAN cell is delayed to maintain a service of the current GSM/GPRS cell or when flexible interworking is not achieved, overall system performance deteriorates. Further, it is difficult to accept the decrease of a search time for cell power measurement and synchronization acquisition required for capability of the GSM/GPRS cell in a state where a service is provided from the GSM/GPRS cell. Therefore, in case of the MS supporting the multi-RAT such as GSM/GPRS, UTRAN, E-UTRAN, etc., it is expected that complexity of the MS is significantly decreased when a different network cell is searched for while receiving a GSM/GPRS service. In addition, it is also expected that capability of the GSM/GPRS service is difficult to be ensured. In particular, unlike in a packet idle mode, it is difficult for the MS operating in a DTM or a packet transfer mode for transmitting/receiving data to sufficiently ensure a radio resource for searching for the different network cell. This is because it is difficult to ensure a synchronization acquisition time and cell power measurement of a cell to be allocated to GSM/GPRS by using only an idle frame, and is difficult to search for the different network cell. Herein, the idle frame is a search frame of which the number is limited to 2 per 52 multiple frames.

Therefore, in order to maintain service capability of the GSM/GPRS network while supporting rapid and accurate interworking with the E-UTRAN supporting a fast data service, there is a need to allocate an additional search time even if there are some losses at the moment in a data service in the GSM/GPRS network. Hereinafter, the search time additionally allocated to search for the different network cell is called an extended search frame.

The extended search frame may be located variously in the multi-frame. For example, a network may allocate the extended search frame either contiguously or non-contiguously to an idle frame. In addition, the number of extended search frames may also vary in the multi-frame. However, the number of extended search frames shall be limited to a proper number since too many extended search frames lead to the difficulty in maintaining of service capability of the GSM/GPRS network.

Figure 6:
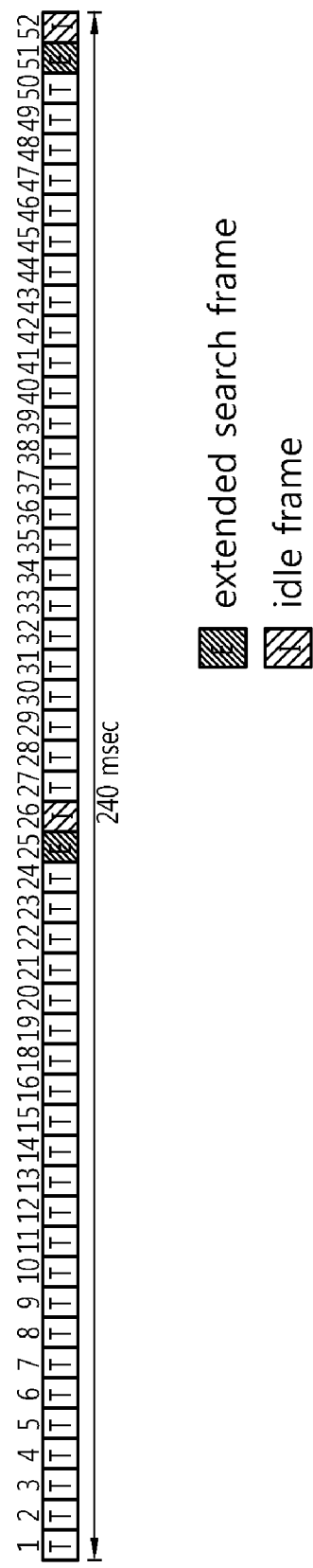
FIG. 6 shows an example of an extended search frame allocated contiguously to an idle frame.

FIG. 6 shows an example of an extended search frame allocated contiguously to an idle frame.

Referring to FIG. 6, a multi-frame includes 52 TDMA frames. Among the 52 TDMA frames, a $26^{th}$ TDMA frame and a $52^{nd}$ TDMA frame are idle frames I. Among the 52 TDMA frames, a network may allocate a $25^{th}$ TDMA frame and a $51^{st}$ TDMA frame as extended search frames E. That is, the extended search frame E may be allocated as a previous frame of the idle frame I.

Figure 7:
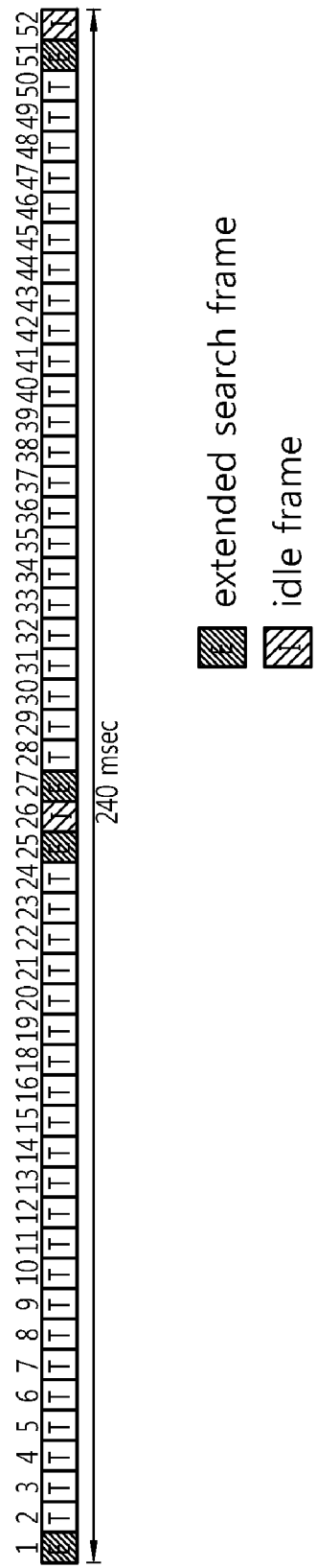
FIG. 7 shows another example of an extended search frame allocated contiguously to an idle frame.

FIG. 7 shows another example of an extended search frame allocated contiguously to an idle frame.

Referring to FIG. 7, among 52 TDMA frames, extended search frames E are a $1^{st}$ TDMA frame, a $25^{th}$ TDMA frame, a $27^{th}$ TDMA frame, and a $51^{st}$ TDMA frame. That is, the extended search frame may be allocated as a previous frame of the idle frame and a next frame of the idle frame.

When the extended search frames are allocated contiguously to the idle frames as shown in FIG. 6 and FIG. 7, a sufficient search time can be ensured for synchronization acquisition of the E-UTRAN cell.

Figure 8:
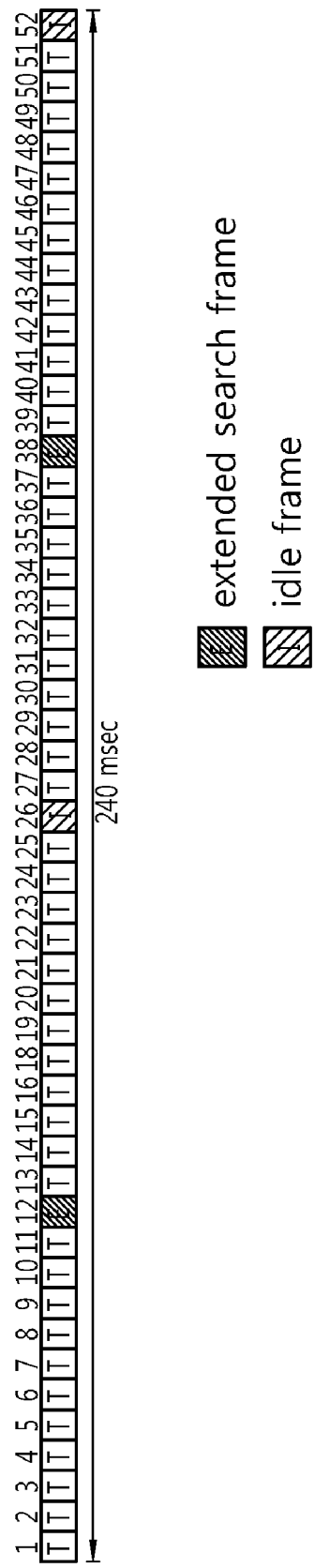
FIG. 8 shows an example of an extended search frame allocated non-contiguously to an idle frame.

FIG. 8 shows an example of an extended search frame allocated non-contiguously to an idle frame.

Referring to FIG. 8, among 52 TDMA frames, extended search frames E are a $12^{th}$ TDMA frame and a $38^{th}$ frame.

Figure 9:
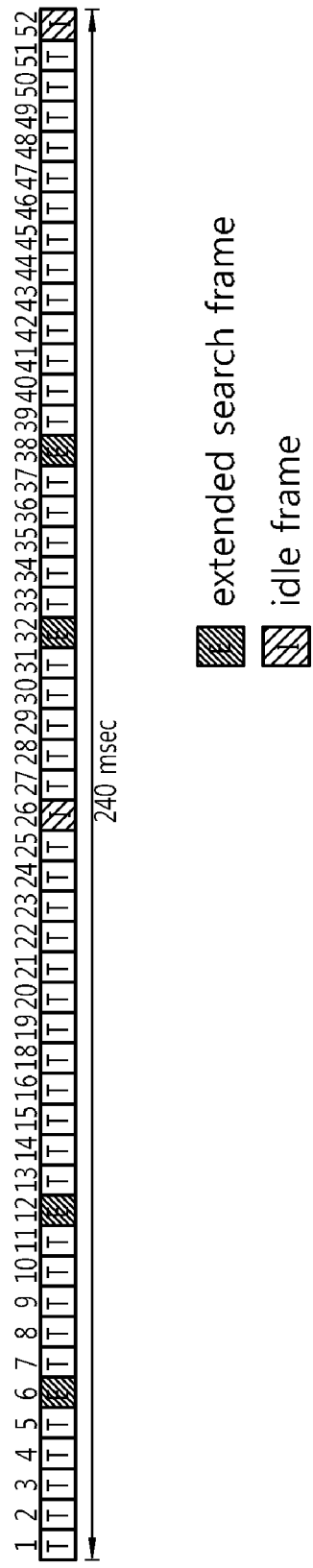
FIG. 9 shows another example of an extended search frame allocated non-contiguously to an idle frame.

FIG. 9 shows another example of an extended search frame allocated non-contiguously to an idle frame.

Referring to FIG. 9, among 52 TDMA frames, extended search frames E are a $6^{th}$ TDMA frame, a $12^{th}$ TDMA frame, a $32^{nd}$ TDMA frame, and a $38^{th}$ TDMA frame. In a multi-frame of FIG. 9, the number of extended search frames is greater than that of FIG. 8. However, the number of extended search frames in the multi-frame shall be limited to a proper number since too many extended search frames lead to the difficulty in maintaining of service capability of the GSM/GPRS network.

Figure 10:
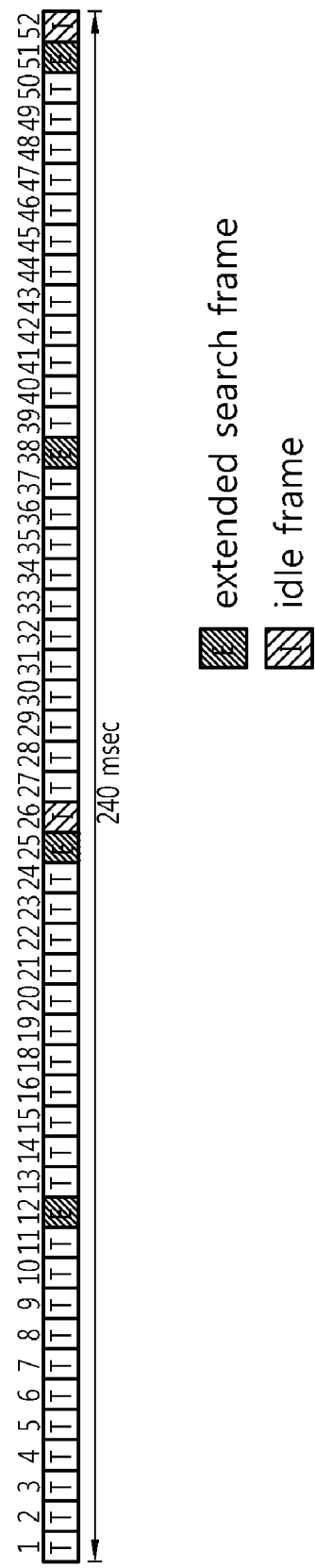
FIG. 10 shows another example of an extended search frame.

FIG. 10 shows another example of an extended search frame.

Referring to FIG. 10, among 52 TDMA frames, extended search frames E are a $12^{th}$ TDMA frame, a $25^{th}$ TDMA frame, a $38^{th}$ TDMA frame, and a $51^{st}$ TDMA frame. That is, some of a plurality of extended search frames may be allocated contiguously to idle frames, and the remaining frames may be allocated non-contiguously to the idle frames.

The extended search frame descried above is for exemplary purposes only, and thus positions and the number of extended search frames are not limited thereto.

The extended search frame is used to allocate an additional search time at the expense of a loss of a data service in the GSM/GPRS network. Therefore, a network does not necessarily allocate the extended search frame always, and preferably allocates the extended search frame in a specific case. The network may allocate the extended search frame in the following cases.

First, the extended search frame may be allocated when an MS is handed over to a different network cell. Second, the extended search frame may be allocated when a received signal strength indication (RSSI) of the different network cell is higher than a specific threshold. Third, the extended search frame may be allocated when the MS requests allocation of the extended search frame to the network. In addition thereto, the network may allocate the extended search frame when necessary.

Now, a method of allocating an extended search frame by a network will be described.

First, the extended search frame may be fixed by preliminary negotiation between the network and an MS. When the extended search frame is fixed through the preliminary negotiation, the network does not have to separately report information on a location of the extended search frame to the MS. Therefore, an overhead of a downlink message can be reduced.

Second, the network may allocate the extended search frame by using an extended search indication message. The extended search indication message includes information on whether to use the extended search frame. In addition to the information on whether to use the extended search frame, the extended search indication message may further include information on an extended search timer, information on a location of the extended search frame, etc.

The following table shows an example of the extended search indication message. However, this is for exemplary purposes only, and thus a format of the extended search indication message is not limited thereto.

TABLE 1

{ 0 | 1     -- '1' indicates    extend search frame is used
{ 0 | 1 < EXT_SEARCH_FRAME_TIMER: bit (n) >}

TABLE 1-continued

{0 | 1 < EXT_SEARCH_FRAME0: bit (5) >}
{0 | 1 < EXT_SEARCH_FRAME1: bit (5) >}}

The extended search indication message indicates whether to use the extended search frame. When the extended search frame can be used, the extended search indication message may include an extended search timer parameter, an extended search frame location parameter, etc.

The extended search timer parameter indicates whether to use an extended search timer. When the extended search timer is not used, the extended search frame can be permanently used until the MS moves to a different network cell.

When the extended search timer is used, a running time of the extended search timer (i.e., EXT_SEARCH_FRAME_TIMER) may be set. If the MS cannot move to the different network cell until the running time of the extended search timer expires, the extended search frame is initialized. By using the extended search timer, resource waste caused by ineffective allocation of the extended search frame can be avoided by initializing the extended search frame if the MS fails to move to the different network cell.

The extended search frame location parameter is information on a location of the extended search frame. If the extended search frame location parameter is not used, the MS may use the extended search frame fixed through the preliminary negotiation between the MS and the network. For example, the extended search frame may be fixed to a previous frame or next frame of an idle frame.

When the extended search frame location parameter is used, at least one or more extended search frames, i.e., EXT_SEARCH_FRAME0 and EXT_SEARCH_FRAME1, may be allocated. For example, the extended search frame may be allocated by indicating an index of a frame to be used as the extended search frame among 52 multiple frames.

The aforementioned method of allocating the extended search frame by the network is for exemplary purposes only, and thus the extended search frame may be allocated by using various other methods.

In a method described below, an extended search frame is allocated to an MS, and a different network cell is searched for by using an idle frame and an extended search frame. It is assumed hereinafter that the MS belongs to a GSM/GPRS cell and a neighbor cell is a cell in which not only the GSM/GPRS cell but also the different network cell coexists. That is, a serving cell is the GSM/GPRS cell. It is assumed that the MS supports a multi-RAT. It is also assumed that the MS operates in a packet transfer mode or a DTM.

A network transmits an extended search indication message to the MS. The extended search indication message includes information on whether to use the extended search frame. When the extended search frame is used, the MS searches for the different network cell by using the idle frame and the extended search frame. The MS analyzes a possibility of moving to the different network cell as quickly as possible by performing channel measurement of the different network cell. When it is suitable to move to the different network cell, the MS attempts synchronization acquisition with the different network cell. If the MS successfully acquires the synchronization with the different network cell, the MS moves to the different network cell, and the extended search frame is initialized.

The extended search indication message is transmitted through a broadcast channel or a dedicated channel. When using the broadcast channel, all MSs in a network cell can receive the extended search indication message. When using the dedicated channel, only specific MS can receive the extended search indication message. For example, the broadcast channel is a broadcast control channel (BCCH) or a packet broadcast control channel (PBCCH), and the dedicated channel is a packet associated control channel (PACCH). In case of GPRS, if the network provides the PBCCH, the PBCCH is used as the broadcast channel, and if the network does not provide the PBCCH, the BCCH is used as the broadcast channel.

In the method of searching for the different network cell, a received signal strength indication (RSSI) of the different network cell may be used as a criterion of using the extended search frame. If the RSSI is not the criterion of using the extended search frame, the MS may use the extended search frame irrespective of the RSSI of the different network cell. Otherwise, if the RSSI is the criterion of using the extended search frame, the MS may use the extended search frame only when the RSSI of the different network cell exceeds a specific threshold.

As described up to now, various embodiments can be applied to the method of using the extended search frame according to a type of a channel for transmitting the extended search message, whether to use the extended search timer, whether to use the RSSI of the different network cell, etc.

The following table shows a classification of embodiments of the method of using the extended search frame by using three criteria.

TABLE 2

| Embodiments No. | Channel | Extended search timer | RSSI |
|---|---|---|---|
| 1 | broadcast channel | X | X |
| 2 | broadcast channel | X | ○ |
| 3 | broadcast channel | ○ | X |
| 4 | broadcast channel | ○ | ○ |
| 5 | dedicated channel | X | X |
| 6 | dedicated channel | X | ○ |
| 7 | dedicated channel | ○ | X |
| 8 | dedicated channel | ○ | ○ |

Each embodiment will be described hereinafter.

1$^{st}$ Embodiment

Figure 11:
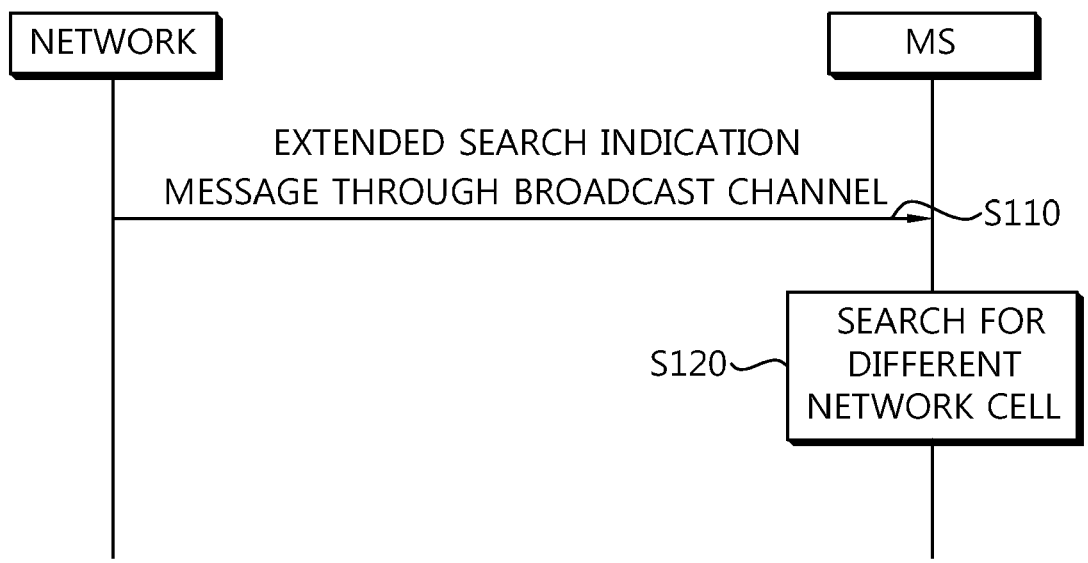
FIG. 11 is a flowchart showing a method of searching for a different network cell according to a $1^{st}$ embodiment of the present invention.

FIG. 11 is a flowchart showing a method of searching for a different network cell according to a 1$^{st}$ embodiment of the present invention.

Referring to FIG. 11, a network transmits an extended search indication message to all MSs supporting a multi-RAT of a corresponding cell through a broadcast channel (step S110). The extended search indication message includes information on whether to use an extended search frame. When using the extended search frame, an MS searches for the different network cell by using an idle frame and the extended search frame (step S120).

(2) 2$^{nd}$ Embodiment

Figure 12:
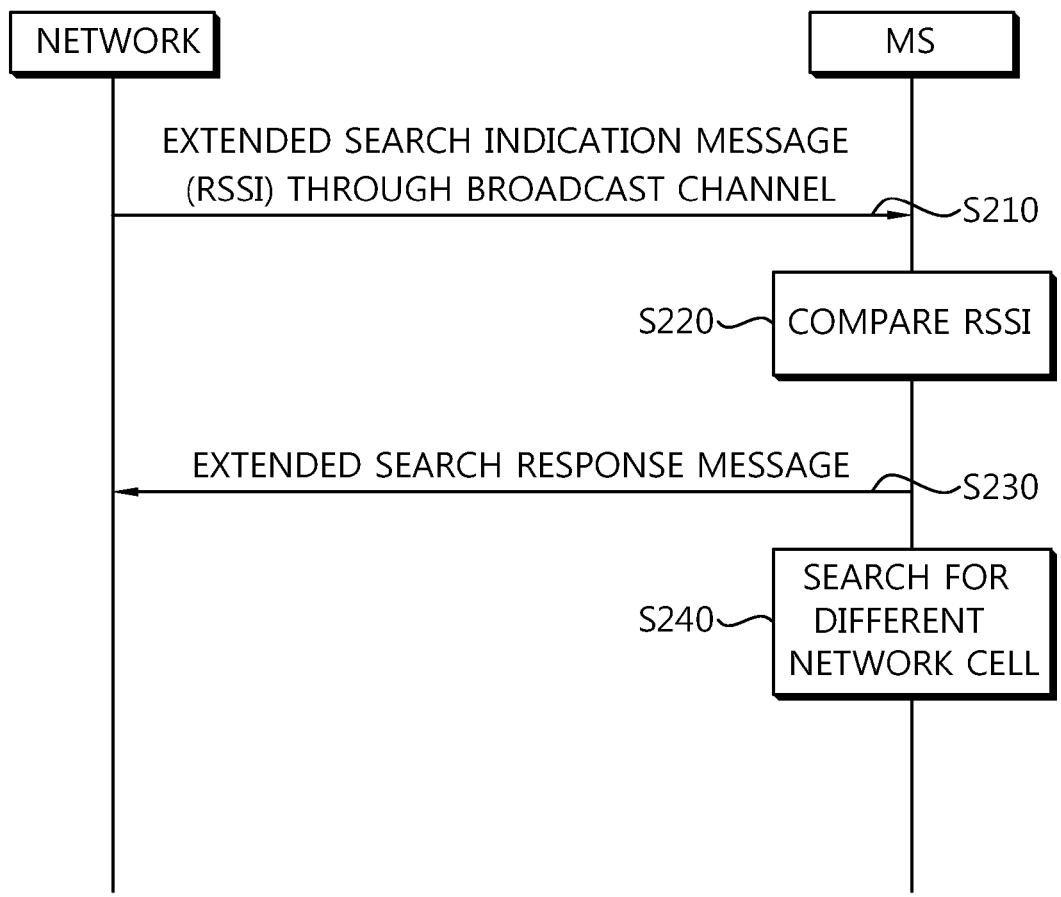
FIG. 12 is a flowchart showing a method of searching for a different network cell according to a $2^{nd}$ embodiment of the present invention.

FIG. 12 is a flowchart showing a method of searching for a different network cell according to a 2$^{nd}$ embodiment of the present invention.

Referring to FIG. 12, a network transmits an extended search indication message to an MS through a broadcast channel (step S210). The extended search indication message includes information on whether to use an extended search frame and information on an RSSI threshold.

The MS measures an RSSI of the different network cell, and compares it with the RSSI threshold notified by the network (step S220).

If the RSSI of the different network cell is greater than the threshold, the MS transmits an extended search response message to the network (step S230). The extended search response message is used to notify the use of the extended search frame by the MS to the network.

The MS searches for the different network cell by using an idle frame and the extended search frame upon transmission of the extended search response message (step S240).

(3) 3$^{rd}$ Embodiment

Figure 13:
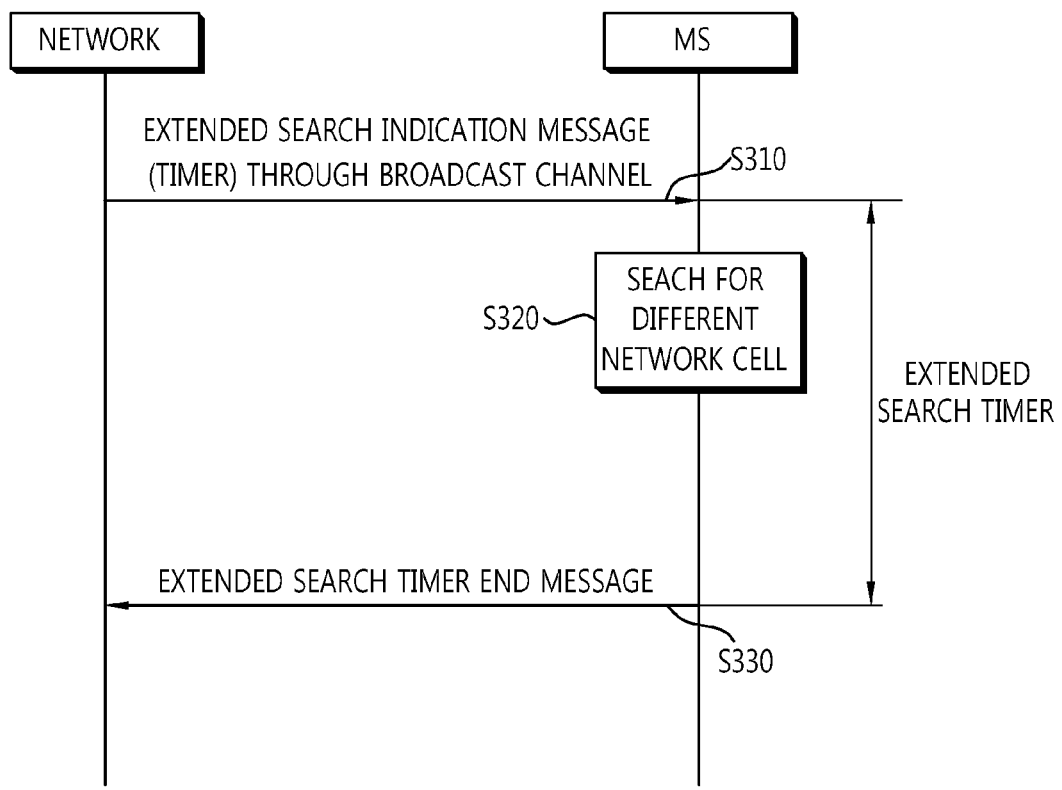
FIG. 13 is a flowchart showing a method of searching for a different network cell according to a $3^{rd}$ embodiment of the present invention.

FIG. 13 is a flowchart showing a method of searching for a different network cell according to a 3$^{rd}$ embodiment of the present invention.

Referring to FIG. 13, a network transmits an extended search indication message to an MS through a broadcast channel (step S310). The extended search indication message includes information on whether to use an extended search frame and information on an extended search timer.

The MS starts the extended search timer upon reception of the extended search indication message. During a running time of the extended search timer, the MS searches for the different network cell by using an idle frame and the extended search frame (step S320). If the MS acquires synchronization with the different network cell, the extended search timer stops. If the MS cannot acquire synchronization with the different network cell until the extended search timer expires, the extended search frame has to be initialized.

In order to initialize the extended search frame, the MS transmits an extended search timer end message to the network (step S330). The network initializes the extended search frame upon reception of the extended search timer end message.

However, in addition to the MS, the network can also use the extended search timer. In this case, the network starts a timer of the network upon transmission of the extended search indication message to the MS. At the expiry of the timer of the network, the network recognizes that the extended search timer of the MS expires. Therefore, if the network also uses the timer of the network, the MS does not have to transmit the extended search timer end message to the network.

(4) 4$^{th}$ Embodiment

Figure 14:
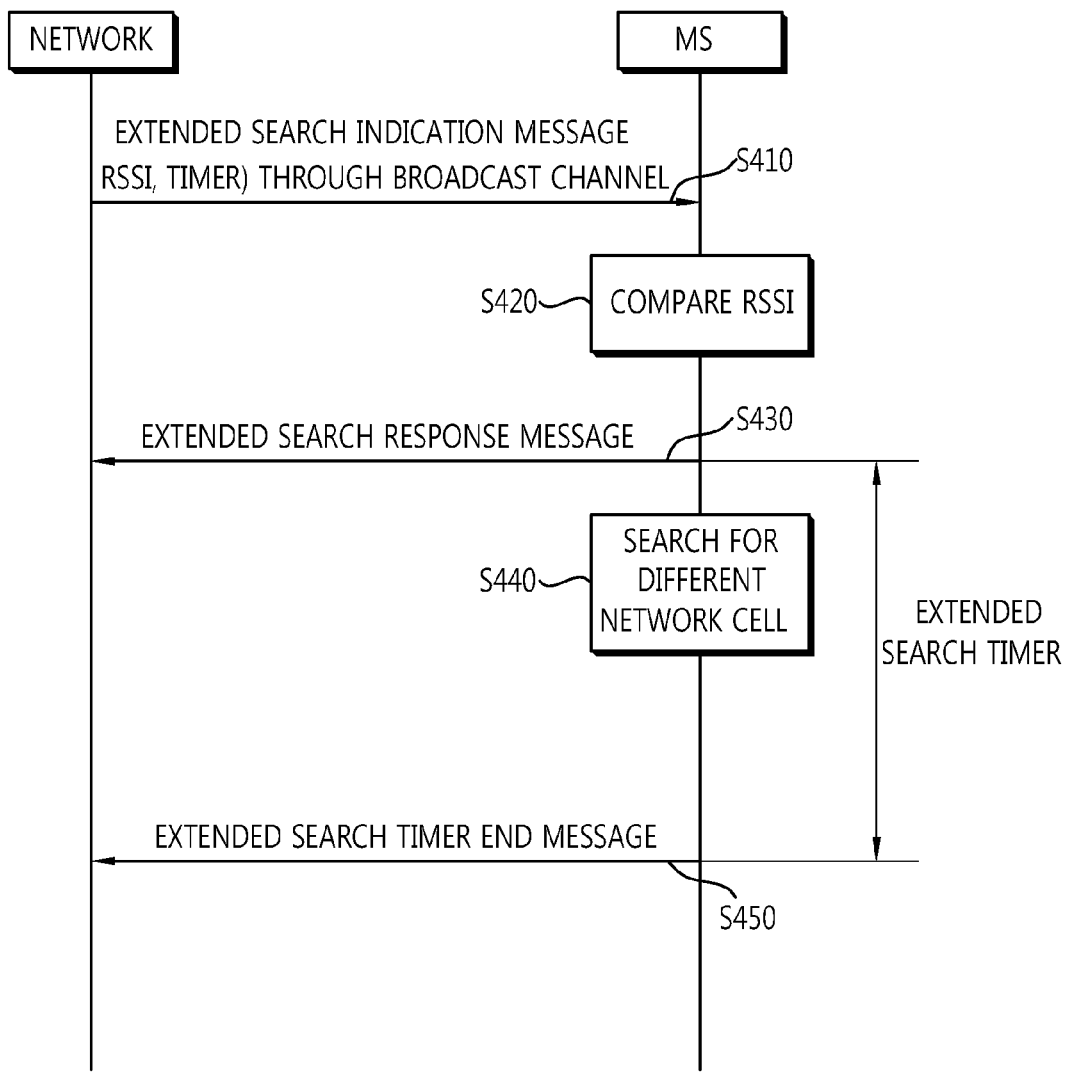
FIG. 14 is a flowchart showing a method of searching for a different network cell according to a $4^{th}$ embodiment of the present invention.

FIG. 14 is a flowchart showing a method of searching for a different network cell according to a 4$^{th}$ embodiment of the present invention.

Referring to FIG. 14, a network transmits an extended search indication message to an MS through a broadcast channel (step S410). The extended search indication message includes information on whether to use an extended search frame, information on an extended search timer, and information on an RSSI threshold.

The MS measures an RSSI of the different network cell, and compares it with the RSSI threshold notified by the network (step S420).

If the RSSI of the different network cell is greater than the threshold, the MS transmits an extended search response message to the network (step S430).

The MS starts the extended search timer upon transmission of the extended search response message. During a running time of the extended search timer, the MS searches for the different network cell by using an idle frame and the extended search frame (step S440).

If the MS cannot acquire synchronization with the different network cell until the extended search timer expires, the MS transmits an extended search timer end message to the network (step S450). However, if the network also uses the timer, since the network can recognize the expiry of the extended search timer of the MS, the MS does not have to transmit the extended search timer end message to the network.

(5) 5$^{th}$ Embodiment

Figure 15:
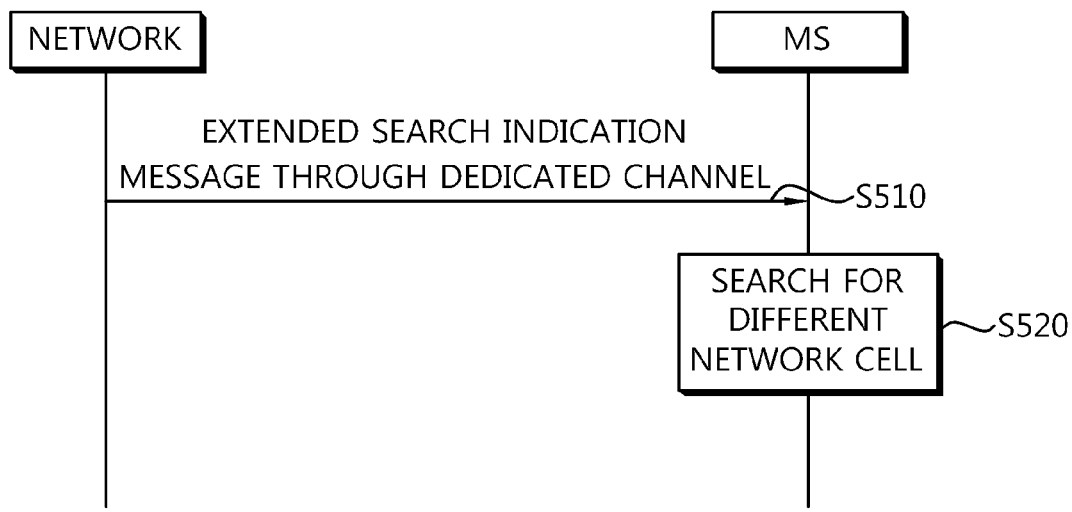
FIG. 15 is a flowchart showing a method of searching for a different network cell according to a $5^{th}$ embodiment of the present invention.

FIG. 15 is a flowchart showing a method of searching for a different network cell according to a 5$^{th}$ embodiment of the present invention.

Referring to FIG. 15, a network transmits an extended search indication message to a specific MS through a dedicated channel (step S510). The extended search indication message includes information on whether to use an extended search frame. When using the extended search frame, an MS searches for the different network cell by using an idle frame and the extended search frame (step S520).

The network may allocate the same extended search frame to all MSs in a cell, or may allocate a different extended search frame to each of specific MSs.

A method of allocating the same extended search frame to all MSs in a cell by a network is as follows. The network may allocate the same extended search frame to all MSs in the cell by allocating the extended search frame fixed through preliminary negotiation between the network and the MS. Alternatively, the network may allocate the same extended search frame to each MS through the dedicated channel.

In addition, the network may allocate a different extended search frame to each of the specific MSs through the dedicated channel.

Figure 16:
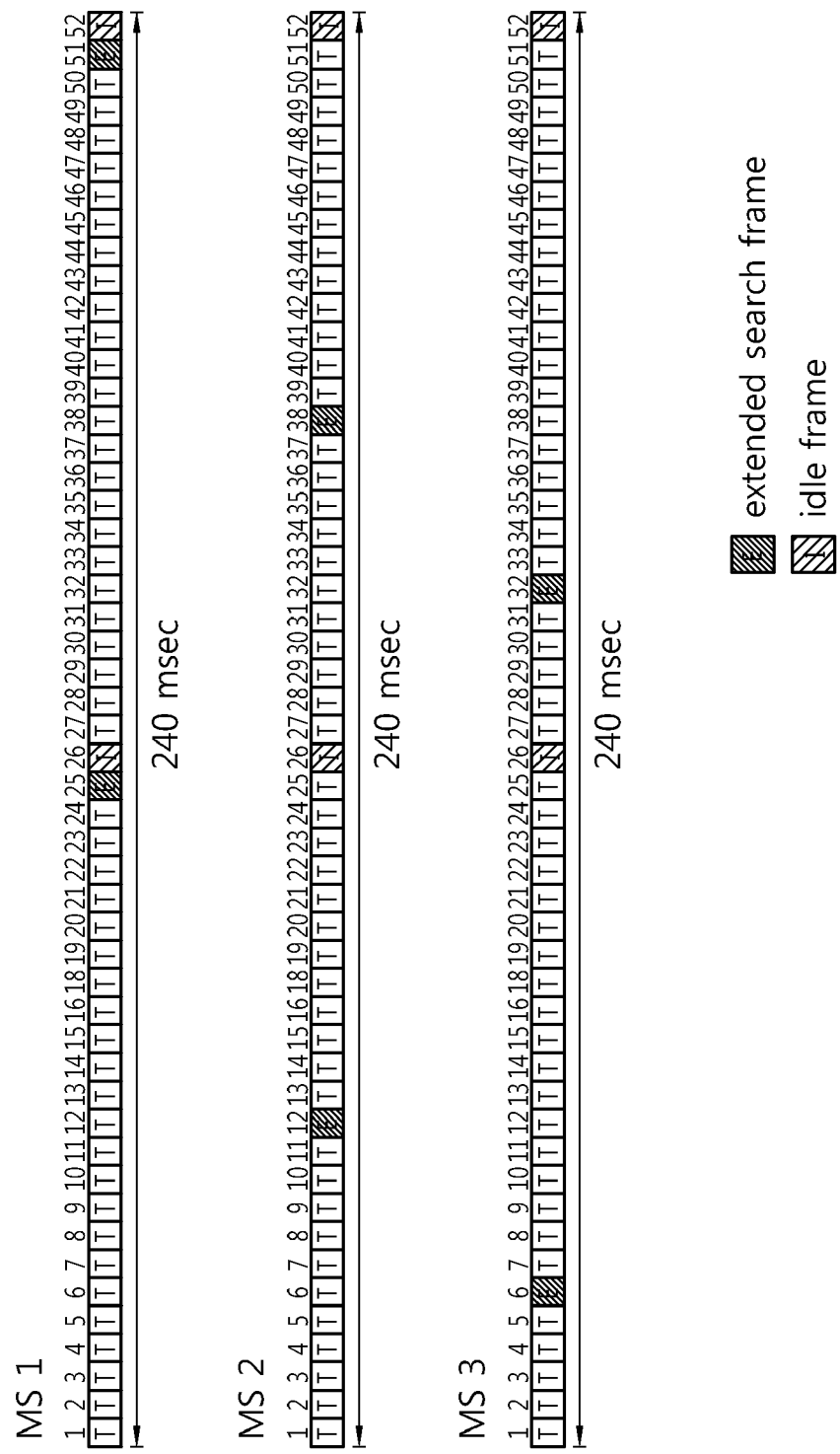
FIG. 16 shows an example of an extended search frame allocated differently to each specific mobile station.

FIG. 16 shows an example of an extended search frame allocated differently to each specific MS.

Referring to FIG. 16, among 52 TDMA frames, a network may allocate a 25$^{th}$ TDMA frame and a 51$^{st}$ TDMA frame to an MS 1 as extended search frames. Among the 52 TDMA frames, the network may allocate a 12$^{th}$ TDMA frame and a 38$^{th}$ TDMA frame to an MS 2 as extended search frames. Among the 52 TDMA frames, the network may allocate a 6$^{th}$ TDMA frame and a 32$^{nd}$ TDMA frame to an MS 3 as extended search frames.

By differently allocating the extended search frame to each MS, a channel resource not allocated to one MS can be used by another MS. Therefore, the network can effectively perform network allocation.

(6) 6$^{th}$ Embodiment

Figure 17:
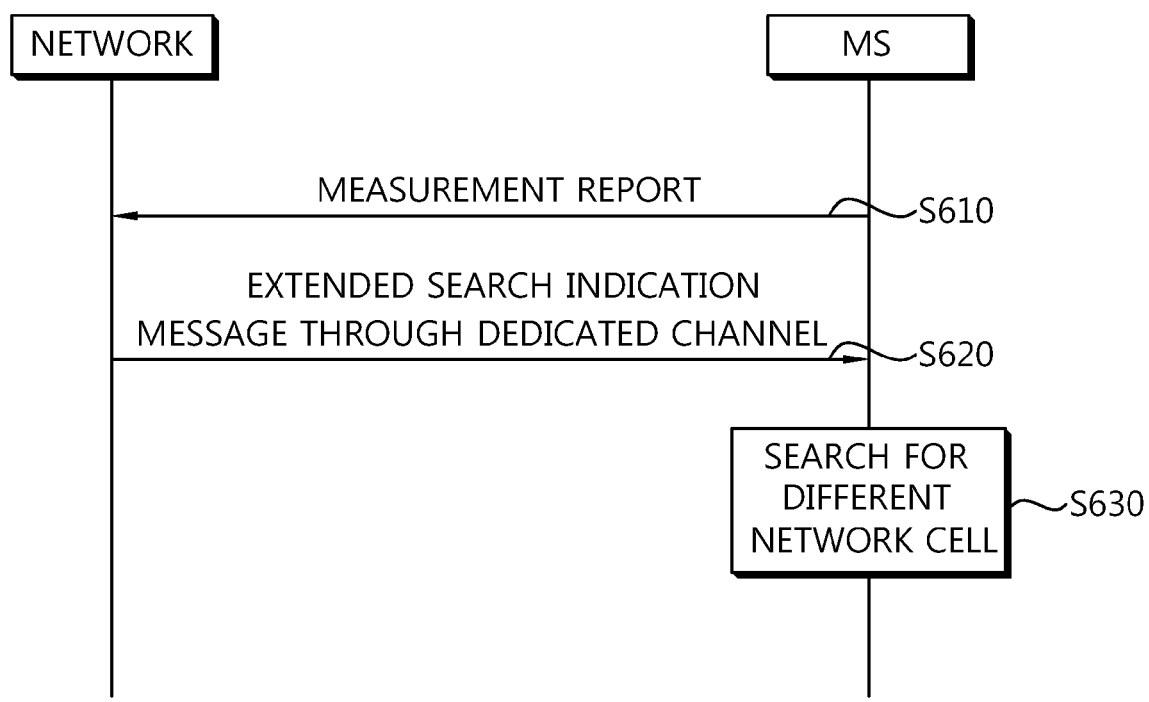
FIG. 17 is a flowchart showing a method of searching for a different network cell according to a $6^{th}$ embodiment of the present invention.

FIG. 17 is a flowchart showing a method of searching for a different network cell according to a 6$^{th}$ embodiment of the present invention.

Referring to FIG. 17, an MS transmits a measurement report to a network (step S610). The measurement report includes information on a different network cell's RSSI measured by the MS. The network compares the RSSI of the MS with a threshold by using the measurement report.

If the RSSI of the MS is greater than the threshold, the network transmits an extended search indication message to the MS through a dedicated channel (step S620). That is, the network transmits the extended search indication message through the dedicated channel only to a specific MS of which the RSSI of the different network cell exceeds the threshold.

The MS searches for the different network cell by using an idle frame and the extended search frame (step S630).

(7) 7<sup>th</sup> Embodiment

Figure 18:
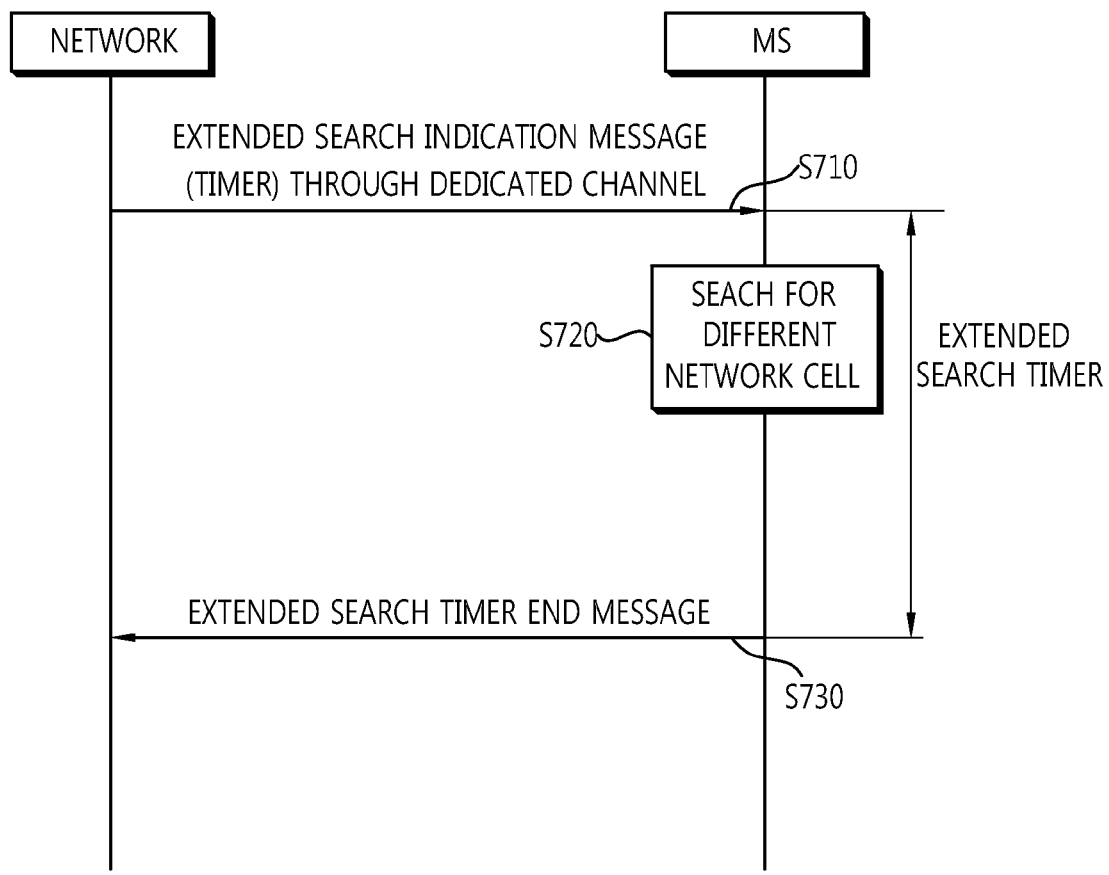
FIG. 18 is a flowchart showing a method of searching for a different network cell according to a $7^{th}$ embodiment of the present invention.

FIG. 18 is a flowchart showing a method of searching for a different network cell according to a 7<sup>th</sup> embodiment of the present invention.

Referring to FIG. 18, a network transmits an extended search indication message to an MS through a dedicated channel (step S710). The extended search indication message includes information on whether to use an extended search frame and information on an extended search timer.

The MS starts an extended search timer upon reception of the extended search indication message. During a running time of the extended search timer, the MS searches for the different network cell by using an idle frame and the extended search frame (step S720).

If the MS cannot acquire synchronization with the different network cell until the extended search timer expires, the MS transmits an extended search timer end message to the network (step S730). However, if the network also uses the timer, since the network can recognize the expiry of the extended search timer of the MS, the MS does not have to transmit the extended search timer end message to the network.

(8) 8<sup>th</sup> Embodiment

Figure 19:
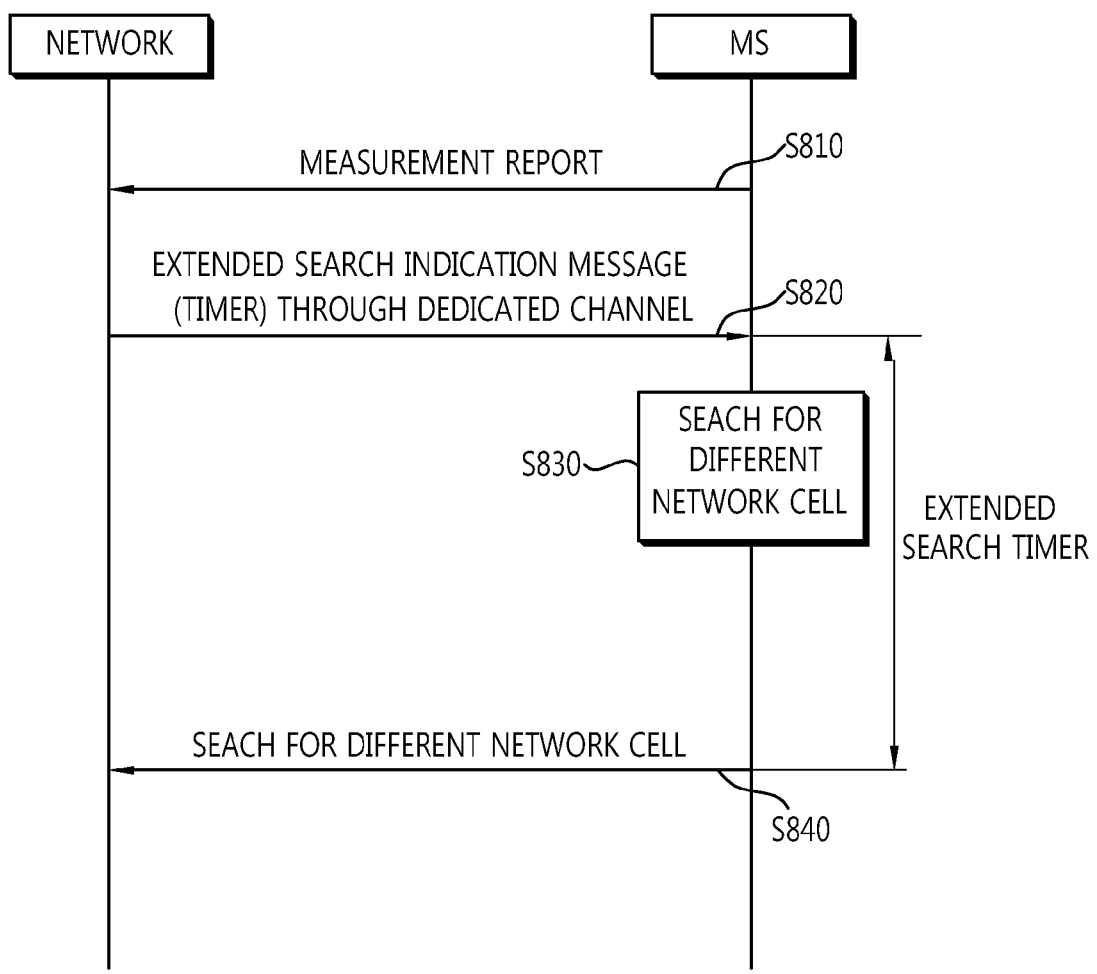
FIG. 19 is a flowchart showing a method of searching for a different network cell according to an $8^{th}$ embodiment of the present invention.

FIG. 19 is a flowchart showing a method of searching for a different network cell according to an 8<sup>th</sup> embodiment of the present invention.

Referring to FIG. 19, an MS transmits a measurement report to a network (step S810). The network compares an RSSI of the MS with a threshold by using the measurement report.

If the RSSI of the MS is greater than the threshold, the network transmits an extended search indication message to the MS through a dedicated channel (step S820). The extended search indication message includes information on whether to use an extended search frame and information on an extended search timer.

The MS starts an extended search timer upon reception of the extended search indication message. During a running time of the extended search timer, the MS searches for the different network cell by using an idle frame and the extended search frame (step S830).

If the MS cannot acquire synchronization with the different network cell until the extended search timer expires, the MS transmits an extended search timer end message to the network (step S840). However, if the network also uses the timer, since the network can recognize the expiry of the extended search timer of the MS, the MS does not have to transmit the extended search timer end message to the network.

Figure 20:
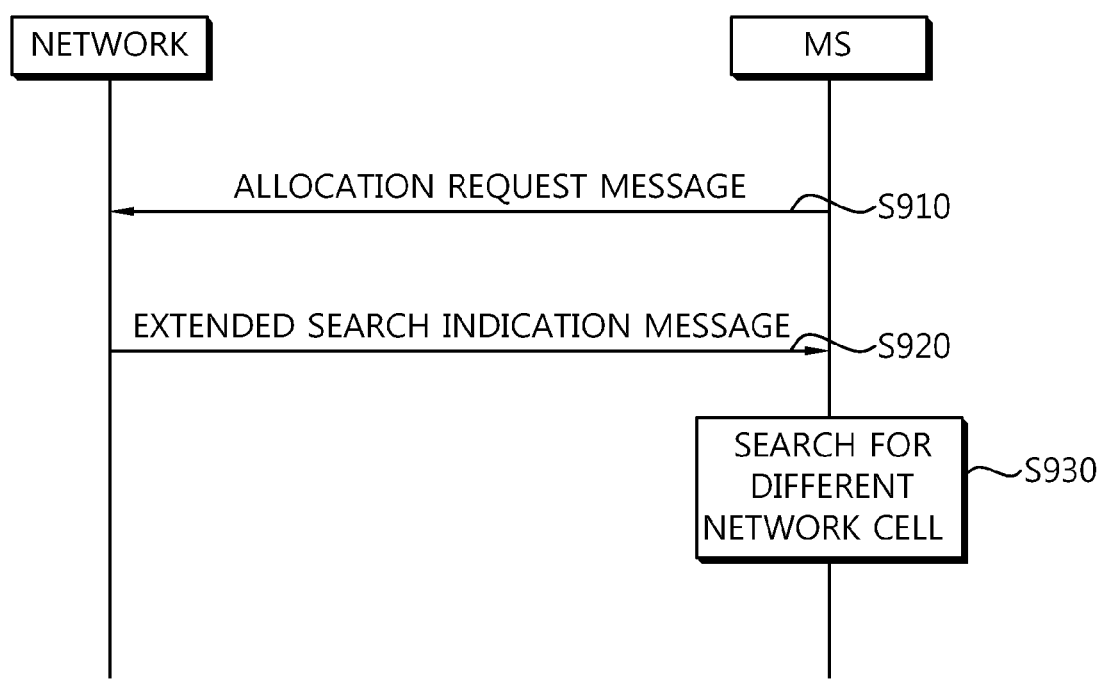
FIG. 20 is a flowchart showing another example of a method of searching for a different network cell.

FIG. 20 is a flowchart showing another example of a method of searching for a different network cell.

Referring to FIG. 20, an MS transmits an allocation request message to a network (step S910). The allocation request message is used to request allocation of an extended search frame to the network. The network transmits an extended search indication message to the MS (step S920). The extended search indication message includes information on whether to use the extended search frame. When using the extended search, the MS searches for the different network cell by using an idle frame and the extended search frame (step S930).

The MS belonging to a GSM/GPRS cell may desire to be handed over to an E-UTRAN cell in order to receive a large-volume service such as video streaming. In this case, the MS may request the network to allocate the extended search frame.

Figure 21:
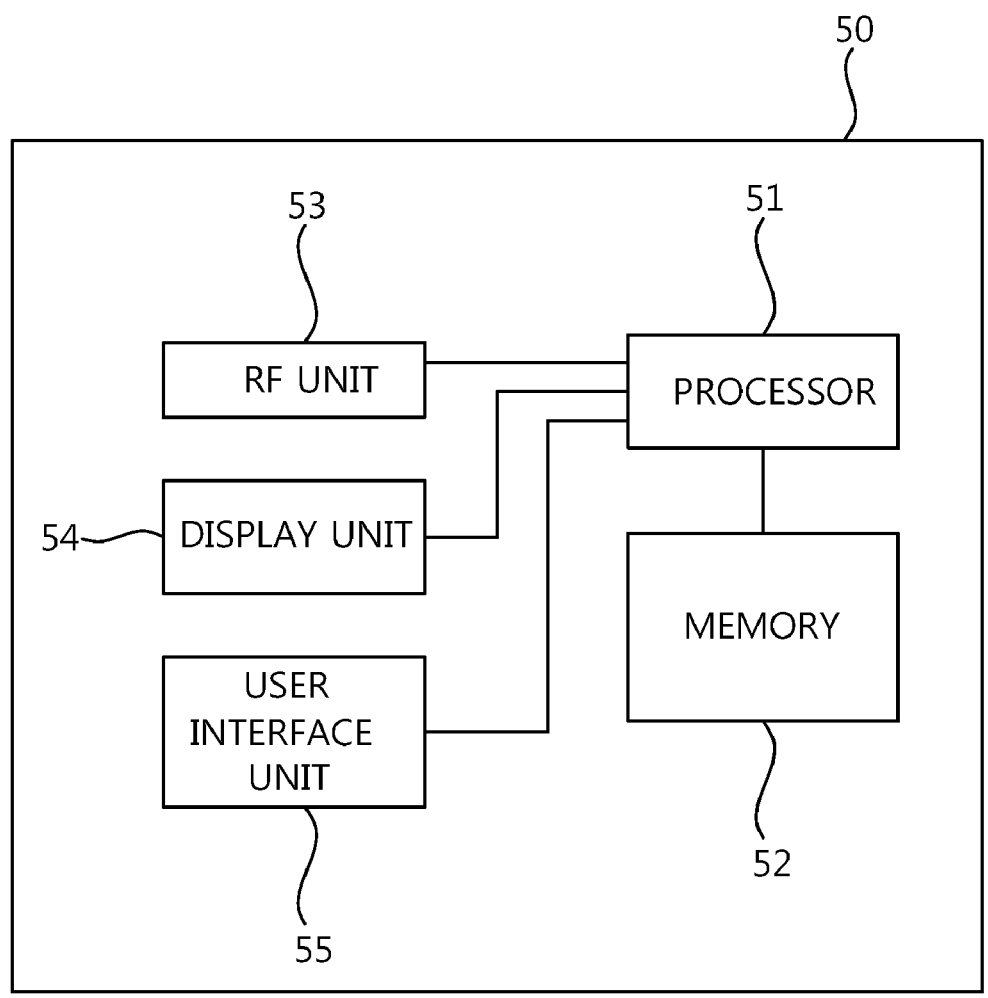
FIG. 21 is a block diagram showing an apparatus for wireless communication.

FIG. 21 is a block diagram showing an apparatus for wireless communication. An apparatus 50 for wireless communication may be a part of an MS. The apparatus 50 for wireless communication includes a processor 51, a memory 52, a radio frequency (RF) unit 53, a display unit 54, and a user interface unit 55. The RF unit 53 is coupled to the processor 51, and transmits and/or receives a radio signal. The memory 52 is coupled to the processor 51, and stores an operating system, an application, and a general file. The display unit 54 displays a variety of information of the MS and may use a well-known element such as a liquid crystal display (LCD), an organic light emitting diode (OLED), etc. The user interface unit 55 can be configured with a combination of well-known user interfaces such as a keypad, a touch screen, etc. The processor 51 performs all of the aforementioned methods for searching for a different network cell.

As such, the present invention can provide a method of searching for a different network cell by an MS to interwork with a different network in a GSM/GPRS system. In addition to an idle frame, an extended search frame is allocated to the MS from a serving cell, thereby ensuring a time of searching for the different network cell. That is, the MS can search for the different network cell while receiving a service from the GSM/GPRS cell. Therefore, a time resource which is an important radio resource in the GSM/GPRS system can be effectively used. In addition, by allowing the MS to promptly move to the different network, a high-speed data service can be effectively received. Accordingly, communication reliability can be increased, and overall system performance can be improved.

The steps of a method described in connection with the embodiments disclosed herein may be implemented by hardware, software or a combination thereof. The hardware may be implemented by an application specific integrated circuit (ASIC) that is designed to perform the above function, a digital signal processing (DSP), a programmable logic device (PLD), a field programmable gate array (FPGA), a processor, a controller, a microprocessor, the other electronic unit, or a combination thereof. A module for performing the above function may implement the software. The software may be stored in a memory unit and executed by a processor. The memory unit or the processor may employ a variety of means that is well known to those skilled in the art.

While the present invention has been particularly shown and described with reference to exemplary embodiments thereof, it will be understood by those skilled in the art that various changes in form and details may be made therein without departing from the spirit and scope of the invention as defined by the appended claims. The exemplary embodiments should be considered in descriptive sense only and not for purposes of limitation. Therefore, the scope of the invention is defined not by the detailed description of the invention but by the appended claims, and all differences within the scope will be construed as being included in the present invention.

The invention claimed is:

1. A method of searching for a different network cell by a mobile station in a global system for mobile communication (GSM)/general packet ratio service (GPRS) system, the method comprising:
  receiving, from a serving cell via a broadcast channel, an indication message including a position of an extended search frame, an operating time for an extended search timer, and a threshold value for signal strength;

measuring a signal strength of the different network cell;
transmitting, to the serving cell via a transmitter of the mobile station, an extended search response message when the signal strength of the different network cell is greater than the threshold value;
starting the extended search timer;
searching, using an idle frame and the extended search frame, for the different network cell during the operating time of the extended search timer; and
transmitting, to the serving cell via the transmitter, an extended search timer end message when synchronization with the different network cell is not established during the operating time of the extended search timer.

2. The method of claim 1, further comprising:
operating the mobile station in a packet transfer mode or a dual transfer mode (DTM).

3. The method of claim 1, wherein the extended search frame is contiguous to the idle frame.

4. A mobile station, comprising:
a radio frequency (RF) unit for transmitting and receiving a radio signal; and
a processor coupled to the RF unit and configured to:
receive, from a serving cell via a broadcast channel, an indication message including a position of an extended search frame, an operating time for an extended search timer, and a threshold value for signal strength;
measure a signal strength of a different network cell;
transmit, to the serving cell via the RF unit, an extended search response message when the signal strength of the different network cell is greater than the threshold value;
start an extended search timer;
search for the different network cell, using an idle frame and the extended search frame, during an operating time of the extended search timer; and
transmit, to the serving cell via the RF unit, an extended search timer end message when synchronization with the different network cell is not established during the operating time of the extended search time.

5. The mobile station of claim 4, wherein the processor is further configured to operate the mobile station in a packet transfer mode or a dual transfer mode (DTM).

6. The mobile station of claim 4, wherein the extended search frame is contiguous to the idle frame.

* * * * *